UNITED STATES PATENT OFFICE.

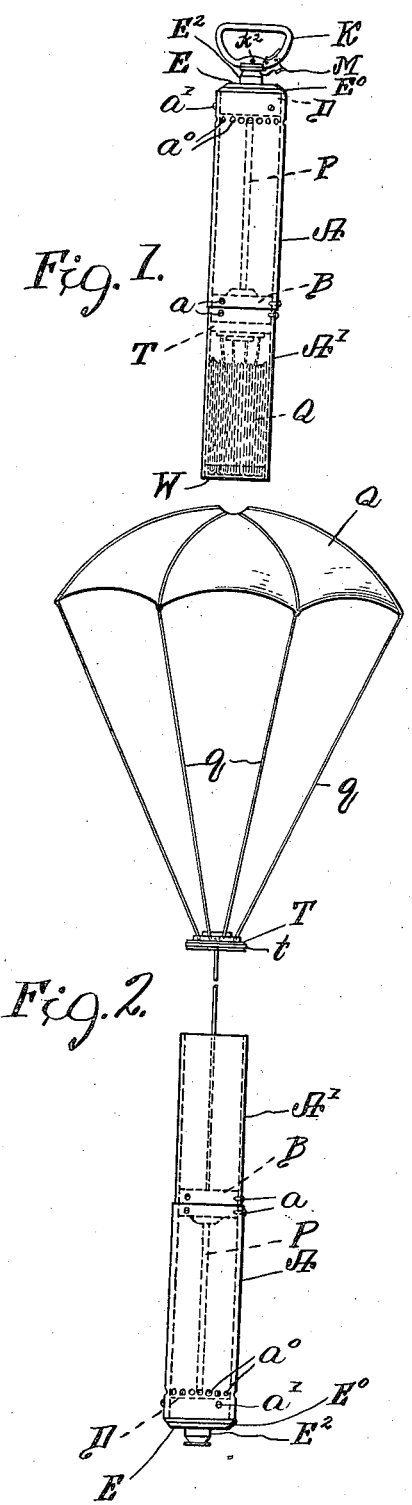
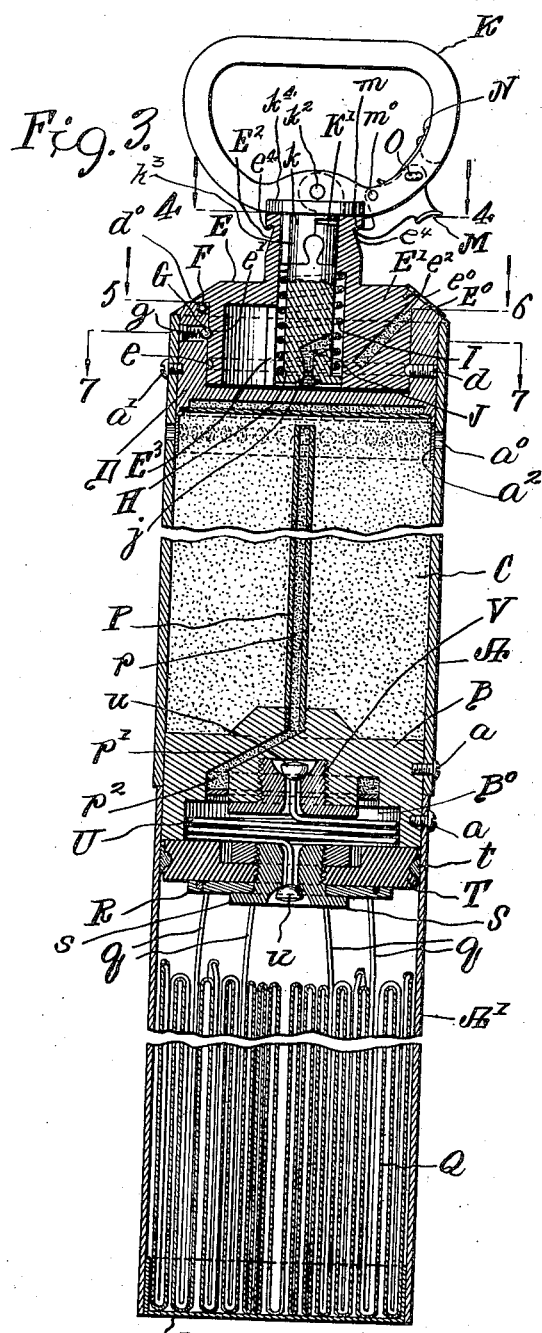

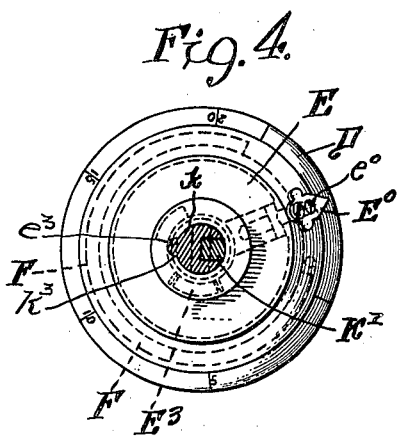
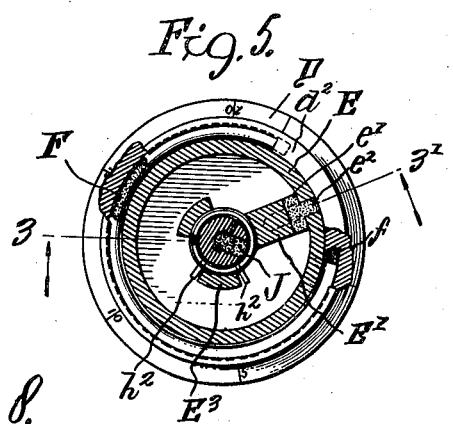
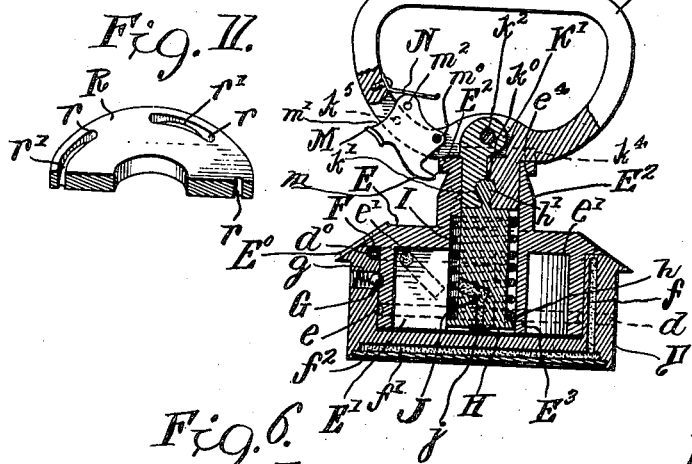
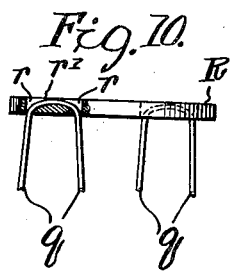
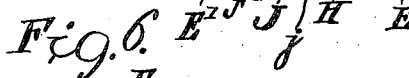
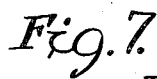
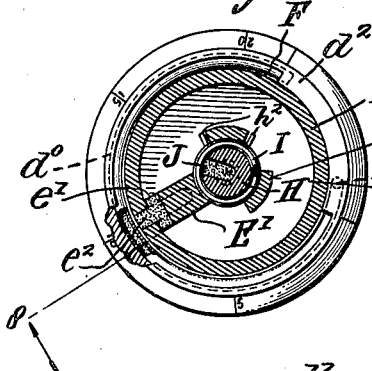
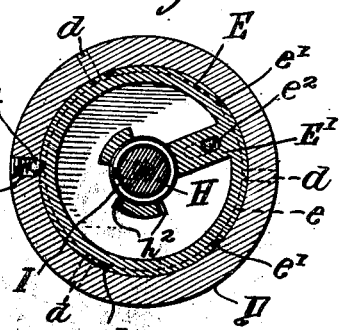
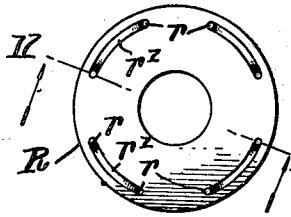

SAMUEL WILEY, JR., OF METUCHEN, NEW JERSEY.

ILLUMINATING AERO-BOMB.

1,319,636.  Specification of Letters Patent.  Patented Oct. 21, 1919.

Application filed March 26, 1919. Serial No. 285,238.

*To all whom it may concern:*

Be it known that I, SAMUEL WILEY, Jr., a citizen of the United States, residing at Metuchen, in the county of Middlesex and State of New Jersey, have invented certain new and useful Improvements in Illuminating Aero-Bombs; and I do hereby declare the following to be a full, clear, and exact description of the invention, such as will enable others skilled in the art to which it appertains to make and use the same.

My present invention relates to illuminating bombs intended to be dropped from aircraft, and it is intended to provide a bomb which may be safely carried and dropped when desired, and which will fall slowly through the air and which will operate after a predetermined time interval, and in falling will illuminate the ground and other objects beneath the bomb.

The invention is not only intended for use in illuminating hostile territory, troops, etc., but is also especially adapted for use in making night landings by aircraft on peaceful missions, such as the landing of hydroplanes in harbors, the landing of aeroplanes on the ground, and in general the brilliant illumination of considerable area of the land or water used for shipping, building or other structures.

My invention will be more fully understood after reference to the accompanying drawings, in which like parts are indicated by similar reference symbols throughout the several views, and in which:—

Figure 1 shows a complete apparatus in compact form, but on a small scale.

Fig. 2 shows the apparatus shortly after it is dropped, and on the same scale as in Fig. 1.

Fig. 3 shows a section through the complete apparatus along the broken line 3—3' of Fig. 5, and looking in the direction of the arrows, the parts being on a larger scale, than in Figs. 1 and 2.

Fig. 4 shows a section along the line 4—4 of Fig. 3, and looking down.

Fig. 5 shows a section along the line 5—5 of Fig. 3, and looking down, with the parts in the safety position.

Fig. 6 is a similar view to Fig. 5, but shows the parts in the armed position.

Fig. 7 shows a section along the line 7—7 of Fig. 3, and looking down.

Fig. 8 shows a section along the line 8—8 of Fig. 6, but with the trigger released.

Fig. 9 is a plan view of the ring to which the parachute cords are attached.

Fig. 10 is an edge view of the device shown in Fig. 9, parts being broken away; and Fig. 11 shows a section along the line 11—11 of Fig. 9, and looking in the direction of the arrows.

A represents the main casing which is preferably cylindrical in form, and attached to and integral therewith is the casing A' adapted to contain the parachute Q.

The outer casing just referred to is separated into a chamber for the illuminating composition C, and a chamber in which the parachute Q is carried in the folded position, as shown in Figs. 1 and 3.

The casing may be secured to the partition block B in any convenient way, as by means of the screws $a$.

The casing may be made of steel or other material, such as brass, aluminum, or the like, and is provided near its upper end with a series of perforations $a^0$, arranged close together so that when the hot gases from the illuminating composition pass through the same, the walls between the perforations will be fused and the closed end of the candle will drop off, exposing the illuminating composition in a highly incandescent state. These perforations are normally closed in any suitable way, as by means of the annular strip $a^2$.

Secured in the upper end of the casing A, as by means of the screws $a'$, is the fuse stock D in the form of a hollow cylindrical cup, fitting snugly and closing the upper end of the casing, in which cup the rotary cap E is mounted.

This cap is provided with an annular groove $e$ adapted to engage the pins $d$, which project into said groove, and thus hold the cap in place against longitudinal movement, but permit it to be rotated within the stock D.

The rotary cap is provided with a series of notches $e'$, corresponding to the length of the burning time train hereinafter to be described, and shown as graduated for five, ten and fifteen seconds, as shown in Figs. 5, 6 and 7. The rotation of the cap is stopped at the desired position by means of the ball G mounted in the recess in the fuse stock D, and pressed inwardly by the spring $g$, as shown in Figs. 3, 7 and 8.

This ball will permit the rotary cap to be turned by twisting the handle K, but will normally hold the rotary cap E in the position at which the time train is set.

Mounted in the groove $d^0$ in the upper inner edge of the fuse stock D is the segmental time train F, one end of which terminates in the segment $d^2$ of the fuse stock, see Figs. 5 and 6, and the other end is connected to the vertical passage $f$ communicating with the ignition charge $f'$ above the disk $f^2$, of paraffin paper or other suitable material, which serves to hold the ignition charge in place as shown in Figs. 1, 3 and 8.

The rotary cap E is provided with a downwardly projecting lug E' containing the transverse passage $e'$, and the upwardly and outwardly inclined passage $e^2$, containing powder to be ignited by the primer, as will be hereinafter described.

This inclined passage $e^2$ is in line with the opening $e^0$ in the pointer $E^0$, which pointer serves to indicate the position at which the rotary cap is set, see Figs. 3, 4 and 8.

The primer $j$ is carried by the plunger H, which is normally pressed downward by the spring I engaging the shoulder $h$ on said plunger. This plunger is provided with a chamber J containing powder which is ignited by the primer $j$ when the same is exploded. This plunger H is connected to the handle K in any convenient way, as by means of the rib $h'$, see Fig. 8, which is pear-shaped in cross section and engages a notch $k^0$ in the stem $k$ of the handle, which stem projects down into a guide groove in the stem $E^2$ of the rotary cap E. This stem is provided with a spline rib $k^3$ engaging in the spline groove $e^3$ in the stem of the rotary cap E.

On its opposite side, the rib $h'$ engages the notch $k'$ in the arm K', which is hinged to the handle as at $k^2$. This arm is prevented from becoming disengaged from the rib $h'$ because it is held in place in the stem $E^2$ of the rotary cap; but if the handle be pulled out far enough against the action of the spring I the handle may be released from engagement with the plunger H, and this occurs when the bomb is dropped.

$E^3$ are guides on the cap E for the plunger H, and $h^2$ are guide pins carried by the plunger itself.

The handle K is provided with an annular flange $k^4$ which brings up against the outer face of the stem $E^2$ when the parts are in the firing position shown in Fig. 8, and the stem $E^2$ is provided with an annular groove $e^4$ adapted to engage the claw $m$ of the trigger piece M, which is pivoted in the handle as at $m^0$ and is provided with a trigger arm $m'$. This trigger is normally pressed into the engaging position by the leaf spring N, and the parts are held in the safety position by means of a safety pin O, which passes through the holes $k^5$ in the handle $m^2$ in the trigger piece, as shown in Figs. 3 and 8.

To operate the device when wanted for use, turn the handle until the indicating hand $E^0$ points to the desired time, then pull out the safety pin O and hold the casing supported by the handle over the side of the aircraft, then pull the trigger M to the position shown in Fig. 8; this releases the bomb from the handle, and in doing so will pull the plunger to the firing position; and the parting of the handle from the bomb will cause the plunger to strike and fire the cap $j$. Thus the fuse is really self-cocking, and absolutely safe to handle. The handle of the bomb remains in the operator's hand.

Projecting up through the inflammable composition C is a tube P, filled with quick burning powder $p$, which powder is also filled into the passage $p'$ and into the annular chamber $p^2$ in the plug B. This plug is provided with a chamber $B^0$ on the opposite side from the illuminating composition, as shown in Fig. 3.

Q represents the parachute, which is shown as folded up in Figs. 1 and 3, and as expanded in Fig. 2. This parachute is connected by the cords $q$ to the ring R, which is provided with passages $r$ on either side of the rounded webs $r'$, as shown in Fig. 10, so that a continuous cord $q$ may be used, and if the tension on any length of the cord becomes excessive, instead of snapping, the cord will reeve over the webs $r'$ and the tension on the cords will be equalized.

This ring R is secured to the movable head T by means of the screw plug S, having the flange $s$, and this head T is preferably provided with suitable packing $t$, as shown in Fig. 3.

A plug V is screwed into the plug B, as shown in Fig. 3, and between the plugs S and V the cable U is mounted, the ends being secured to the buttons $u$, as shown in Fig. 3, and the body of the cable when mounted in the casing being coiled up in the chamber $B^0$ in the plug B.

The lower end of the outer casing is closed by the movable head W, which is adapted to be readily blown out of the casing when the parachute is to be released.

The operation of the device is as follows:—

Suppose the rotary cap to be in the safety position shown in Figs. 3, 4 and 5, if when in this position the primer is ignited in any way, the flame from the primer and from the chamber J will ignite the powder in the passages $e'$ and $e^2$, and the flame and gases will escape through the opening $e^0$ in the pointer $E^0$ without igniting the inflammable composition Now to operate the parts, turn the rotary cap from the safety position (which is that position taken when the passage $e^2$ registers with the lug $d^2$, as shown in Fig. 5), until the passage $e^2$ registers with some part of the powder time train F. This powder train is contained in a fusible tube of lead or the like, or it may be inclosed in a paper tube, so that when the primer charge explodes and ignites the charge in the passages $e'$ and $e^2$, the time train will be ignited, and will communicate its flame from the charge in the passage $e^2$ to the powder in the powder charge $f$ and the annular charge $f'$, blowing out the disk $f^2$ and igniting the illuminating composition C.

As soon as the device begins to fall through the air, the fuse end being heavier than the parachute end will cause the casing to tilt and it will quickly assume the inverted position shown in Fig. 2.

After the fuse has burned for the predetermined time, the flame will ignite the powder charges $p$, $p'$ and $p^2$ and will blow out the ring P' and also the heads T and W. After the ignition takes place the intense heat of the illuminating composition will cause the gases escaping through the openings $a^0$ in the casing to melt off what was originally the fuse end of the casing but which now becomes the lower end of the casing, and the lower end of the candle will be exposed and will yield an intensely brilliant light, which will be thrown downward in the form of a cone, thus illuminating a circular area on the earth beneath.

The parachute will cause the candle to sink slowly down through the air, and the illumination will continue until the candle has burned out.

It will be noted that the fuse may be set to ignite the candle at any predetermined time interval after the bomb has been released, so that the bomb can pass entirely clear of the aircraft from which it is dropped without any danger of fire or explosion to the aircraft, or to its occupants. Moreover, it will be seen that the device cannot be fired when the trigger is in the safety position, with the safety pin engaging the same, nor can the illuminating charge be ignited unless the rotary cap is set for a suitable time interval to provide the desirable element of safety to the aircraft and its occupants.

The cable U should be made strong enough to stand the sudden jerk which takes place when the parachute opens, and any inequalities of tension on the cords $q$ will be automatically equalized by these cords reeving over the rounded edges of the webs $r'$.

The cylindrical casing may be made of any suitable metal, preferably of an alloy of aluminum because of its lightness and because the fuse end would readily melt off when the candle begins to burn freely.

It will be obvious that various modifications might be made in the construction, combination and arrangement of parts which could be used without departing from the spirit of my invention; and I do not mean to limit the invention to such details of construction except as particularly pointed out in the claims.

Having thus described my invention what I claim and desire to secure by Letters Patent of the United States is:—

1. An illuminating areo-bomb comprising a casing, a partition block dividing said casing into a chamber for the illuminating compound and a parachute chamber, illuminating material carried in one of said chambers and a parachute in the other, a head carrying a time fuse closing the end of said first-mentioned chamber, with perforations in said casing near the base of said head to permit the escape of hot gases from the illuminating compound when ignited, means for setting said fuse for the desired time interval, means for firing said fuse, and means controlled by said fuse for expelling said parachute and for igniting the illuminating compound in said illuminating chamber, substantially as described.

2. An illuminating aero-bomb comprising a casing, a partition block dividing said casing into a chamber for the illuminating compound and a parachute chamber, illuminating material carried in one of said chambers and a parachute in the other, a cable connecting said parachute to said partition block, a head carrying a time fuse closing the end of said first-mentioned chamber, with perforations in said casing near the base of said fuse to permit the escape of hot gases from the illuminating compound when ignited, means for setting said fuse for the desired time interval, means for firing said fuse, and means controlled by said fuse for expelling said parachute and for igniting the illuminating compound in said illuminating chamber, substantially as described.

3. An illuminating aero-bomb comprising a casing, a partition block dividing said casing into a chamber for the illuminating compound and a parachute chamber, illuminating material carried in one of said chambers and a parachute in the other, a head carrying a time fuse closing the end of said first-mentioned chamber, means for detaching said head when the illuminating compound is ignited, means for setting said fuse for the desired time interval, means for firing said fuse, and means controlled by said fuse for expelling said parachute and for igniting the illuminating compound in said illuminating chamber, substantially as described.

4. An illuminating aero-bomb comprising a casing, a partition block dividing said casing into a chamber for the illuminating compound and a parachute chamber, illuminating material carried in one of said chambers and a parachute in the other, a cable connecting said parachute to said partition block, a head carrying a time fuse closing the end of said first-mentioned chamber, means for detaching said head when the illuminating compound is ignited, means for setting said fuse for the desired time interval, means for firing said fuse, and means controlled by said fuse for expelling said parachute and for igniting the illuminating compound in said illuminating chamber, substantially as described.

5. An illuminating aero-bomb comprising a cylindrical casing, a partition block dividing said casing into a chamber for the illuminating compound and a parachute chamber, illuminating material carried in one of said chambers and a parachute in the other, a time fuse having its stock closing the end of said first-mentioned chamber, a rotary cap mounted in said stock and carrying the firing mechanism, a handle secured to said cap for supporting the bomb and for setting said fuse for the desired time interval, a trigger carried by said handle for firing said fuse, and means controlled by said fuse for expelling said parachute and for igniting the illuminating compound in said illuminating chamber, substantially as described.

6. An illuminating aero-bomb comprising a cylindrical casing, a partition block dividing said casing into a chamber for the illuminating compound and a parachute chamber, illuminating material carried in one of said chambers and a parachute in the other, a time fuse having its stock closing the end of said first-mentioned chamber, the said casing being provided with a series of closely disposed perforations near the base of said fuse stock, a rotary cap mounted in said stock and carrying the firing mechanism, a handle secured to said cap for supporting the bomb and for setting said fuse for the desired time interval, a trigger carried by said handle for firing said fuse, and means controlled by said fuse for expelling said parachute and for igniting the illuminating compound in said illuminating chamber, substantially as described.

7. An illuminating aero-bomb comprising a cylindrical casing, a partition block dividing said casing into a chamber for the illuminating compound and a parachute chamber, illuminating material carried in one of said chambers and a parachute in the other, a cable connecting said parachute with said partition block, a time fuse having its stock closing the end of said first-mentioned chamber, a rotary cap mounted in said stock and carrying the firing mechanism, a handle secured to said cap for supporting the bomb and for setting said fuse for the desired time interval, a trigger carried by said handle for firing said fuse, and means controlled by said fuse for expelling said parachute, and for igniting the illuminating compound in said illuminating chamber, substantially as described.

8. An illuminating aero-bomb comprising a cylindrical casing, a partition block dividing said casing into a chamber for the illuminating compound and a parachute chamber, illuminating material carried in one of said chambers and a parachute in the other, a cable connecting said parachute with said partition block, a time fuse having its stock closing the end of said first-mentioned chamber, the said casing being provided with a series of closely disposed perforations near the base of said fuse stock, a rotary cap mounted in said stock and carrying the firing mechanism, a handle secured to said cap for supporting the bomb and for setting said fuse for the desired time interval, a trigger carried by said handle for firing said fuse, and means controlled by said fuse for expelling said parachute and for igniting the illuminating compound in said illuminating chamber, substantially as described.

9. An illuminating aero-bomb comprising a casing, a partition block dividing said casing into a chamber for the illuminating compound and a parachute chamber, illuminating material carried in one of said chambers and a parachute in the other, a head carrying a time fuse closing the end of said first-mentioned chamber, means for detaching said head when the illuminating compound is ignited, means for setting said fuse for the desired time interval, means for firing said fuse, and means for expelling said parachute and for igniting the illuminating compound in said illuminating chamber, substantially as described.

10. An illuminating aero-bomb comprising a casing, a partition block dividing said casing into a chamber for the illuminating compound and a parachute chamber, illuminating material carried in one of said chambers and a parachute in the other, a cable connecting said parachute to said partition block, a head carrying a time fuse closing the end of said first-mentioned chamber, means for detaching said head when the illuminating compound is ignited, means for setting said fuse for the desired time interval, means for firing said fuse, and means for expelling said parachute and for igniting the illuminating compound in said illuminating chamber, substantially as described.

11. An illuminating aero-bomb comprising a cylindrical casing, a partition block dividing said casing into a chamber for the illuminating compound and a parachute chamber, illuminating material carried in one of said chambers and a parachute in the other, a time fuse having its stock closing the end of said first-mentioned chamber, a rotary cap mounted in said stock and carrying the firing mechanism, a handle secured to said cap for supporting the bomb and for setting said fuse for the desired time interval, a trigger carried by said handle for firing said fuse, and means for expelling said parachute and for igniting the illuminating compound in said illuminating chamber, substantially as described.

12. An illuminating aero-bomb comprising a cylindrical casing, a partition block dividing said casing into a chamber for the illuminating compound and a parachute chamber, illuminating material carried on one of said chambers and a parachute in the other, a time fuse having its stock closing the end of said first-mentioned chamber, the said casing being provided with a series of closely disposed perforations near the base of said fuse stock, a rotary cap mounted in said stock and carrying the firing mechanism, a handle secured to said cap for supporting the bomb and for setting said fuse for the desired time interval, a trigger carried by said handle for firing said fuse, and means for expelling said parachute and for igniting the illuminating compound in said illuminating chamber, substantially as described.

13. An illuminating aero-bomb comprising a cylindrical casing, a partition block dividing said casing into a chamber for the illuminating compound and a parachute chamber, illuminating material carried in one of said chambers and a parachute in the other, a cable connecting said parachute with said partition block, a time fuse having its stock closing the end of said first-mentioned chamber, a rotary cap mounted in said stock and carrying the firing mechanism, a handle secured to said cap for supporting the bomb and for setting said fuse for the desired time interval, a trigger carried by said handle for firing said fuse, and means for expelling said parachute, and for igniting the illuminating compound in said illuminating chamber, substantially as described.

14. An illuminating aero-bomb comprising a cylindrical casing, a partition block dividing said casing into a chamber for the illuminating compound and a parachute chamber, illuminating material carried in one of said chambers and a parachute in the other, a cable connecting said parachute with said partition block, a time fuse having its stock closing the end of said first-mentioned chamber, the said casing being provided with a series of closely disposed perforations near the base of said fuse stock, a rotary cap mounted in said stock and carrying the firing mechanism, a handle secured to said cap for supporting the bomb and for setting said fuse for the desired time interval, a trigger carried by said handle for firing said fuse, and means for expelling said parachute and for igniting the illuminating compound in said illuminating chamber, substantially as described.

15. An illuminating aero-bomb comprising a casing, a partition block dividing said casing into a chamber for the illuminating compound and a parachute chamber, illuminating material carried in one of said chambers and a parachute in the other, a head carrying a time fuse closing the end of said first-mentioned chamber, means for detaching said head when the illuminating compound is ignited, and means controlled by said fuse for expelling said parachute and for igniting the illuminating compound in said illuminating chamber, substantially as described.

16. An illuminating aero-bomb comprising a casing, a partition block dividing said casing into a chamber for the illuminating compound and a parachute chamber, illuminating material carried in one of said chambers and a parachute in the other, a cable connecting said parachute to said partition block, a head carrying a time fuse closing the end of said first-mentioned chamber, means for detaching said head when the illuminating compound is ignited, and means controlled by said fuse for expelling said parachute and for igniting the illuminating compound in said illuminating chamber, substantially as described.

17. An illuminating aero-bomb comprising a cylindrical casing, a partition block dividing said casing into a chamber for the illuminating compound and a parachute chamber, illuminating material carried in one of said chambers and a parachute in the other, a time fuse having its stock closing the end of said first-mentioned chamber, a rotary cap mounted in said stock and carrying the firing mechanism, a handle secured to said cap for supporting the bomb and for setting said fuse for the desired time interval, and a trigger carried by said handle for firing said fuse, substantially as described.

18. An illuminating aero-bomb comprising a cylindrical casing, a partition block dividing said casing into a chamber for the illuminating compound and a parachute chamber, illuminating material carried in one of said chambers and a parachute in the other, a time fuse having its stock closing the end of said first-mentioned chamber, the said casing being provided with a series of closely disposed perforations near the base of said fuse stock, a rotary cap mounted in said stock and carrying the firing mechanism, a handle secured to said cap for supporting the bomb and for setting said fuse for the desired time interval, and a trigger carried by said handle for firing said fuse, substantially as described.

19. An illuminating aero-bomb comprising a cylindrical casing, a partition block dividing said casing into a chamber for the illuminating compound and a parachute chamber, illuminating material carried in one of said chambers and a parachute in the other, a cable connecting said parachute with said partition block, a time fuse having its stock closing the end of said first-mentioned chamber, a rotary cap mounted in said stock and carrying the firing mechanism, a handle secured to said cap for supporting the bomb and for setting said fuse for the desired time interval, and a trigger carried by said handle for firing said fuse, substantially as described.

20. An illuminating aero-bomb comprising a cylindrical casing, a partition block dividing said casing into a chamber for the illuminating compound and a parachute chamber, illuminating material carried in one of said chambers and a parachute in the other, a cable connecting said parachute with said partition block, a time fuse having its stock closing the end of said first-mentioned chamber, the said casing being provided with a series of closely disposed perforations near the base of said fuse stock, a rotary cap mounted in said stock and carrying the firing mechanism, a handle secured to said cap for supporting the bomb and for setting said fuse for the desired time interval, and a trigger carried by said handle for firing said fuse, substantially as described.

SAMUEL WILEY, Jr.